Jan. 16, 1940. M. DÖRING 2,187,418

TEMPERATURE REGULATOR

Filed Sept. 23, 1936

WITNESSES:
Michael Stark
H.G. Hepler.

INVENTOR
Martin Döring.
BY
W.R. Coley
ATTORNEY

Patented Jan. 16, 1940

2,187,418

UNITED STATES PATENT OFFICE 2,187,418

TEMPERATURE REGULATOR

Martin Döring, Dresden, Germany, assignor to Westinghouse Electric & Manufacturing Company, East Pittsburgh, Pa., a corporation of Pennsylvania Application September 23, 1936, Serial No. 102,081
In Germany October 7, 1935

5 Claims. (Cl. 200—137)

My invention relates to temperature regulators, particularly of the adjustable-range type.

It is an object of my invention to supply a relatively simple and compact construction of a regulator having thereon a simple effective means for adjusting the range of said regulator, said means either being varied at the regulator itself or at any point remote therefrom.

In regulators of this type known to the prior art it is quite common for certain spaced parts thereof to become badly battered and marred due to severe impacts which result in the regulator becoming out of adjustment and due to such disfigurement of the parts thereof, it becomes difficult to readjust the regulator. It is, therefore, an object of my invention to overcome this operating difficulty by maintaining the co-acting parts thereof in constant contact with each other.

A further operating difficulty of those regulators common to the prior art is that they only have one means for varying their adjustment. My invention adds a second separate means of adjustment, thereby giving a wider range and a more accurate means of control.

Another advantage of my invention over the prior art is that it makes possible control over the range of temperature of operation of the regulator from any remote distance. In this way my invention makes possible the control of the temperature of an oven or furnace and also holds the temperature variations within the desired limits.

Figure 1:
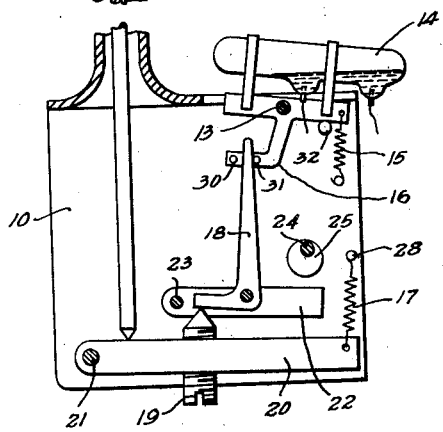
Figure 2:
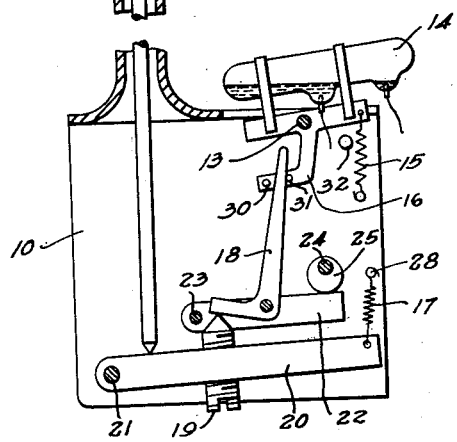

Other objects of my invention and advantages over the prior art will become evident from the following description taken in conjunction with the accompanying drawing, in which:

Figures 1 and 2 are views, chiefly in elevation and partly in section, of a temperature regulator embodying my invention in two characteristic positions.

Referring to the drawing, I have shown a temperature-responsive device 11—12 mechanically attached to base member 10 so that both tube 11 and elongated rod 12 enclosed therein are free to move in accordance with temperature variations. It will be understood that the temperature-responsive device 11—12 may be placed at the point, the temperature of which it is desired to employ as means for controlling a given device, such as switch device 14, hereinafter described.

The lower end of elongated rod 12 may be pointed and engages an intermediate point of lever 20 which is pivotally mounted on base 10 by means of a stud 21, located close to one end of the lever. Lever 20 is kept in contact with the elongated rod 12 due to the action of a spring 17, which is attached to lever 20 at the end opposite from stud 21, and to a pin 28 in base 10.

An adjustable fulcrum, such as a screw 19, threaded through lever 20 intermediate elongated rod 12 and spring 17 is biased by the latter to contact the horizontal arm of a bell-crank lever 18 pivotally mounted intermediate the ends of intermediate lever 22 which is swingably mounted upon base 10 above lever 20 by means of stud 23, disposed near one end thereof. In order to vary or adjust the operating range or critical operating temperature of my regulator, I provide preferably a cam or eccentric 25 rotatably mounted on base 10 above the free end of intermediate lever 22 by means of shaft 24. This shaft may be actuated manually or by remote control, electrical or otherwise, as will be understood. The force of gravity causes intermediate lever 22 to seek a lower level, this action resulting in intermediate lever 22 taking the lowest position permitted by the co-action of screw 19 and bell-crank lever 18.

It will be appreciated that the swinging vertical arm of bell-crank lever 18 may be employed for various useful purposes such as making and breaking electrical contacts, directly or indirectly. As shown, a mercury-tube type of contact maker and breaker 14 is suitably mounted on a tiltable lever structure 16 comprising an upper member pivoted on the base by pin 13 and a lower arm having a plurality of stops 30 and 31 disposed on opposite sides of the vertical arm of bell-crank lever 18. In this way swinging movement of lever 18 causes the mercury tube contact maker 14 either to occupy its closed position shown in Fig. 1 or its open position shown in Fig. 2.

In order to bias the mercury tube to the closed position of Fig. 1, a spring 15 is secured to the right-hand end of lever structure 16, the other end of the spring being suitably attached to base 10. To limit the position to which the mercury tube may tilt toward the right, thus insuring circuit closure through the mercury, a stop 32 is disposed in the proper location under the upper member of lever structure 16, as shown in Fig. 1.

Referring to Fig. 2, I have illustrated the elongated rod 12 of temperature-responsive device 11—12 at its upper or hot position. Intermediate lever 22 is then in contact with and has been stopped in its angularly upward travel by rotatable eccentric 25. Bell-crank lever 18 has been swung in a clockwise direction, due to the intermediate lever 22 having been fixed in position after engaging eccentric 25, thereby causing lever 16 to rotate in a counter-clockwise direction about stud 13, resulting in switch 14 being actuated to its open position.

When the temperature-responsive device 11—12 is subjected to a decreased temperature, elongated rod 12 expands downwardly, also causing lever 20 to be forced down in a clockwise direction against the action of spring 17 and take with it screw 19. Bell-crank lever 18 is then permitted to rotate in a counter-clockwise direction as lever 22 drops in a clockwise direction, this action releasing the pressure on lever 16, which then is pulled in a clockwise direction by spring 15 and is stopped in its angular motion by pin 32. The rotation of lever 16 thus causes the mercury tube switch 14 to occupy its closed position, as shown in Fig. 1.

In adjusting the temperature regulating device, screw 19 may be run upwardly to cause bell-crank lever 18 to force lever 16 to tilt more quickly than before and accordingly cause switch 14 to operate with a shorter contracting stroke of the elongated rod 12, thus causing the switch 14 to open at a lower temperature of temperature-responsive device 11—12 and its associated parts. In order to have switch 14 function at a higher temperature, screw 19 is lowered to the desired level. The temperature-responsive device 11—12 is then required to contract a longer distance before the lever 18 is forced into the proper position by screw 19, to cause the switch 14 to operate to its open position. It is therefore obvious that a very wide range of control is afforded by selecting the desired position of screw 19.

In the above illustrations of showing one means of adjusting the operating point of the regulator it was assumed that eccentric 25 was kept stationary in one of an infinite number of positions. Assuming screw 19 to be held stationary I, therefore, have additional means for regulating the range of operation of the regulator; namely, by rotating the eccentric 25 to determine the position where intermediate lever 22 is stopped in its angular movement. As shown in Fig. 2, eccentric 25 has its larger section, or that portion having the longer radius, in a downward direction, thus stopping the angular movement of lever 22 much sooner than if the smaller portion were down. With the eccentric as shown in Fig. 2 the regulator will function with a minimum movement of elongated rod 12 and intermediate lever 22 and accordingly at a much lower temperature than when the eccentric is in the extreme opposite position.

If the operator so chooses, the eccentric 25 can be permanently attached to a shaft 24 which rotates within a bearing located in base 10. This shaft may have attached to its outward end a dial of a familiar type which could show by means of a pointer attached to said shaft the range of operation of the regulator. By rotating this dial to any desired setting the operator would rotate the eccentric 25 and therefore change the range of the regulator to that shown on said dial, as will be readily understood.

By connecting the shaft 24, through proper gears, to a selsyn motor drive or any other similar device the regulator can be remotely controlled.

It will be obvious to those skilled in the art that variations are possible within the scope of this invention. It is therefore desired that the foregoing description and the drawing be regarded as illustrative only. No limitations therefore are intended except such as are required by the prior art or expressly recited in the accompanying claims.

I claim as my invention:

1. In combination with a movable thermostatic member, circuit-controlling means mechanically connected to said member and responsive to the movements thereof, a member being swingable about one end and having a pivotal connection with said means at a point intermediate the ends thereof, and means for limiting the movements of said swingable member, said means engaging the movable end of said swingable member and said mechanical connection comprising an adjustable structure biased to act upon both said thermostatic member and said circuit-controlling means.

2. In combination with a movable thermostatic member, circuit-controlling means mechanically connected to said member and responsive to the movements thereof, a member being swingable about one end and having a pivotal connection with said means at a point intermediate the ends thereof, and means for limiting the movements of said swingable member, said means engaging the movable end of said swingable member, said means comprising an eccentric.

3. In combination with a movable thermostatic member, circuit-controlling means mechanically connected to said member and responsive to the movements thereof, a member being swingable about one end and having a pivotal connection with said means at a point intermediate the ends thereof, and means for limiting the movements of said swingable member, said means engaging the movable end of said swingable member, said means comprising a rotatable eccentric, and means for operating said rotatable eccentric.

4. In combination with a movable thermostatic member, a movable member, a threaded member operable therein, a resilient member mechanically connected to said movable member to bias said movable member to constant mechanical connection with said thermostatic member, circuit-controlling means mechanically connected to said threaded member and being responsive to the movements of said threaded member moving in conjunction with said movable member, a swingable member having a pivotal connection with said means, and means for adjustably limiting angular movements of said swingable member.

5. In combination with a movable thermostatic member, a movable member, a threaded member operable therein, a resilient member mechanically connected to said movable member to bias said movable member to constant mechanical connection with said thermostatic member, circuit-controlling means mechanically connected to said threaded member and being responsive to the movements of said threaded member moving in conjunction with said movable member, a member swingable about one end and having a pivotal connection with said means at a point intermediate the ends thereof, means for limiting the oscillatory movements of said swingable member, said means comprising a rotatable eccentric engaging the movable end of said swingable member, a tiltable member mechanically connected to said circuit-controlling means and responsive to the movements thereof, and a tubular liquid switch mechanically connected to said rotatable member and functioning with the movements thereof.

MARTIN DÖRING.